US006667947B2

United States Patent
Maeda et al.

(10) Patent No.: US 6,667,947 B2
(45) Date of Patent: Dec. 23, 2003

(54) OPTICAL MULTI-LAYER INFORMATION RECORDATING MEDIUM

(75) Inventors: Takanori Maeda, Tsurugashima (JP); Ikuya Kikuchi, Tsurugashima (JP); Makoto Sato, Tsurugashima (JP); Katsuhiro Koike, Tsurugashima (JP); Yoshitsugu Araki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 203 days.

(21) Appl. No.: 09/988,813

(22) Filed: Nov. 20, 2001

(65) Prior Publication Data

US 2002/0067666 A1 Jun. 6, 2002

(30) Foreign Application Priority Data

Dec. 1, 2000 (JP) .............................. 2000-366668

(51) Int. Cl.⁷ .................................. G11B 7/24
(52) U.S. Cl. ................ 369/275.1; 369/94; 428/64.4
(58) Field of Search ............... 369/275.1, 94, 369/281, 286, 13.35, 13.39, 275.2, 275.3; 428/64.4, 64.1, 64.3; 430/270.13

(56) References Cited

U.S. PATENT DOCUMENTS

| | | | | |
|---|---|---|---|---|
| 4,450,553 A | * | 5/1984 | Holster et al. ............ | 369/275.5 |
| 5,373,499 A | * | 12/1994 | Imaino et al. ............ | 369/275.4 |
| 5,499,231 A | * | 3/1996 | Fennema et al. ............ | 369/94 |
| 5,608,715 A | * | 3/1997 | Yokogawa et al. ......... | 369/275.1 |
| 5,625,609 A | * | 4/1997 | Latta et al. ............... | 369/44.23 |
| 5,627,816 A | * | 5/1997 | Ito et al. .................. | 369/275.1 |
| 5,640,382 A | * | 6/1997 | Florczak et al. ......... | 369/275.1 |
| 5,689,497 A | * | 11/1997 | Wilting et al. ........... | 369/275.1 |
| 5,708,653 A | * | 1/1998 | Okada et al. ............. | 369/275.1 |
| 5,764,619 A | * | 6/1998 | Nishiuchi et al. ........ | 369/275.1 |
| 5,777,969 A | * | 7/1998 | Tomiyama et al. ........... | 369/94 |
| 5,828,648 A | * | 10/1998 | Takasu et al. ............ | 369/275.1 |
| 5,878,018 A | * | 3/1999 | Moriya et al. ............ | 369/275.1 |
| 5,959,961 A | * | 9/1999 | Matsui ..................... | 369/275.1 |
| 6,160,787 A | * | 12/2000 | Marquardt et al. ....... | 369/275.1 |
| 6,343,060 B1 | * | 1/2002 | Ko ........................... | 369/275.1 |

* cited by examiner

*Primary Examiner*—Tan Dinh
(74) *Attorney, Agent, or Firm*—Morgan, Lewis & Bockius LLP

(57) ABSTRACT

The present invention relates to an optical multi-layer information recording medium for recording information therein and/or retrieving information therefrom upon radiation of a convergent beam of light. The recording medium includes at least two pairs of recording layer and light-transmissive layer stacked one after another. A first recording layer proximal to a beam radiation side and a second recording layer distal from the beam radiation side are made from a material that satisfies a function including the following parameters; transmissivity and absorptance of the first recording layer, absorptance of the second recording layer, a numerical aperture on the first recording layer, a numerical aperture of the second recording layer, and transmissivity of between the first and second recording layers. Even if the numerical apertures change with spherical aberration compensation made to respective recording layers, a power density of a light spot does not change. Thus, recordation can be performed with consistent recording characteristics.

10 Claims, 4 Drawing Sheets

OPTICAL MULTI-LAYER INFORMATION RECORDATING MEDIUM

BACKGROUND OF THE INVENTION

1. Field of the Invention

The present invention relates to an optical information recording medium such as an optical disc to record information on tracks, and more particularly to an optical multi-layer information recording medium having a plurality of recording layers stacked via light-transmissive spacer layer (s).

2. Description of the Related Art

In recent times, optical discs are widely utilized as means for recording and reproducing data such as image data, voice data and computer data. For example, DVD (Digital Versatile Disc) are marketed as optical discs that can record data at high density. Various types of DVDs are available with respect to schemes of data recordation and retrieval. One type of DVD is a multi-layer optical disc having a plurality of recording layers.

One example of a DVD is a read-only, two-layer optical disc. Referring to FIG. 1 of the accompanying drawings, the two-layer optical disc has a proximal recording layer (occasionally referred to as "first layer"), which is closer to an object lens of a pickup when viewed from a reading side, and a distal recording layer (occasionally referred to as "second layer") which is further from the object lens. The first layer is semitransparent so that it is possible to read a signal from the second layer through the first layer.

A spacer layer is provided between the first and second layers such that the first and second layers are equally spaced from each other. The spacer layer is light transmissive. Since a scanning beam passes through the spacer layer, the material of the spacer layer has transmissivity that is high at a wavelength of the reading beam.

It is possible to read signals from the first and second layers from the same side of the optical disc by only shifting a focus of the scanning beam if the two-layer optical disc is used. Shifting the focus is called focus jump or jumping. This type of two-layer optical disc is marketed as DVD-ROM (Read Only Memory) when the two-layer optical disc is designed for read-only purpose.

If the thickness of the spacer in the DVD-ROM two-layer optical disc is large, i.e., if the distance between the first and second layers is large, the beam of light defocuses and spreads at the second layer when the beam of light focuses on the first layer. As a result, pits and/or recordation marks in the second layer are not resolved, and a reflection light from the second layer is hardly modulated by the pits. Thus, if an average reflectance of the second layer does not change, it is feasible to read only the signal from the first layer by taking a high frequency component from the read signal with a high-pass filter. Likewise, if the scanning beam focuses on the second layer, it is possible to read only the signal of the second layer.

In order to increase the recording capacity, a next generation optical disc system has a pickup equipped with an object lens having a large numerical aperture (e.g., NA=0.85) and employs an optical disc having a larger number of stacked layers than a current DVD.

When the numerical aperture of the object lens increases, spherical aberration occurs if the thickness of the light-transmissive cover layer at the outermost surface of the optical disc is deviated from a standard value since a scanning or recording beam passes through the cover layer. As a result, a spatial frequency characteristic (MTF) which the object lens inherently possesses is not obtained. In particular, when a short mark or pit is recorded or read, irregularity in the cover layer thickness results in increased jitter. Because the multi-layer optical disc has a cover layer and a large number of spacer layers, a total thickness of layers from the cover layer to a target recording layer is large, and therefore the spherical aberration should be suppressed.

In order to solve the above described problem, an expander (optical unit including a combination of two lenses) is located between a light source and an object lens to compensate for the spherical aberration. The expander causes an incident parallel beam to become a convergent or divergent beam and to emerge towards the object lens. Consequently, the emergent beam from the object lens has certain spherical aberration that compensates for the spherical aberration produced at the cover layer. When the cover layer thickness has a standard value, the expander causes the parallel incident beam to emerge as the parallel beam so as to slightly change a diameter of the beam. If the object lens is designed such that spherical aberration generated when the beam emerges from the object lens counterbalances spherical aberration generated at the cover layer having the standard thickness, a light spot focused through the cover layer has no spherical aberration. If, on the other hand, the cover layer thickness deviates from the standard value, the expander causes a divergent or convergent beam, rather than a parallel beam, to emerge. For example, when the cover layer is thinner than the standard thickness, the expander causes the convergent beam to emerge towards the object lens. The spherical aberration produced in the object lens is increased but counterbalanced by the spherical aberration that is reduced by the cover layer. Thus, no aberration occurs on an information recording surface. An appropriate correction is made.

When the above described correction is performed, however, the focusing manner of the incident beam is changed. In general, therefore, not only the spherical aberration but also the numerical aperture of the object lens vary. For instance, when the converged beam is caused to be incident to the object lens, the emergent beam of the object lens focuses at a position before an originally designed focusing position of the object lens, and the numerical aperture increases. Accordingly, the numerical aperture varies with the correction made on the spherical aberration. If the numerical aperture changes together with the spherical aberration correction, the spot diameter on the recording layer changes with an amount of spherical aberration correction, i.e., position of the recording layer. As a result, a problem is created in that an optimum recording power varies when a signal is recorded. Compensation by a reproduction signal equalizer or the like is not effective during the recording so that perfect characteristic compensation has to be made before the recording.

In order to solve the above described problems, a recording apparatus may change the recording power in accordance with the spot diameter that changes between the first and second layers. When the recording power should be changed, however, the recording apparatus has to perform complicated power control and/or have a complicated structure if high speed modulation is performed in the recording power control because the power control is needed for the first and second layers respectively. Particularly, when high density recording is required, the recording power should be changed and the recording pulse waveform should be adjusted.

SUMMARY OF THE INVENTION

An object of the present invention is to provide an optical multi-layer information recording medium that can maintain power density of a spot on an optical disc to be substantially constant even if a numerical aperture change results from compensation made to correct spherical aberration at different recording layer positions, whereby recording characteristic is maintained even if recordation is performed without adjusting the recording power.

According to one aspect of the present invention, there is provided an optical multi-layer information recording medium for recording information therein and/or retrieving information therefrom upon radiation of a convergent beam of light, comprising at least two pairs of recording layers and light-transmissive layers stacked one after another, wherein a first recording layer proximal to a beam radiation side and a second recording layer distal from the beam radiation side are made from a material that satisfies the following equation:

$$(Tr_x \times Tr_z \times Ab_y)/Ab_x \approx (NA_y)^2/(NA_x)^2$$

where $Tr_x$ represents transmissivity of the first recording layer, $Tr_z$ represents a sum of transmissivity of recording layer(s) and spacer layer(s) stacked between the first and second recording layers, $Ab_y$ represents absorptance of the second recording layer, $Ab_x$ represents absorptance of the first recording layer, $NA_y$ represents a numerical aperture on the second recording layer and $NA_x$ represents a numerical aperture of the first recording layer.

At least one of the recording layers may include a land track and/or a groove track. At least one of the recording layers may be made from a phase change material. The recording layers may be fabricated from different materials.

According to another aspect of the present invention, there is provided an optical multi-layer information recording medium for recording information therein and/or retrieving information therefrom upon radiation of a convergent beam of light, comprising a first recording layer proximal to a beam radiation side, a light-transmissive layer stacked on the first recording layer, and a second recording layer stacked on the light-transmissive layer and distal from the beam radiation side, wherein the first and second recording layers are made from a material that satisfies the following equation:

$$(Tr_1 \times Ab_2)/Ab_1 \approx (NA_2)^2/(NA_1)^2$$

where $Tr_1$ represents transmissivity of the first recording layer, $Ab_2$ represents absorptance of the second recording layer, $Ab_1$ represents absorptance of the first recording layer, $NA_2$ represents a numerical aperture on the second recording layer and $NA_1$ represents a numerical aperture on the first recording layer.

At least one of the first and second recording layers may include a land track and/or a groove track. At least one of the first and second recording layers may be made from a phase change material. The first and second layers may be fabricated from different materials.

DETAILED DESCRIPTION OF THE INVENTION

Embodiments of the present invention will be described in reference to the accompanying drawings.

Figure 2:
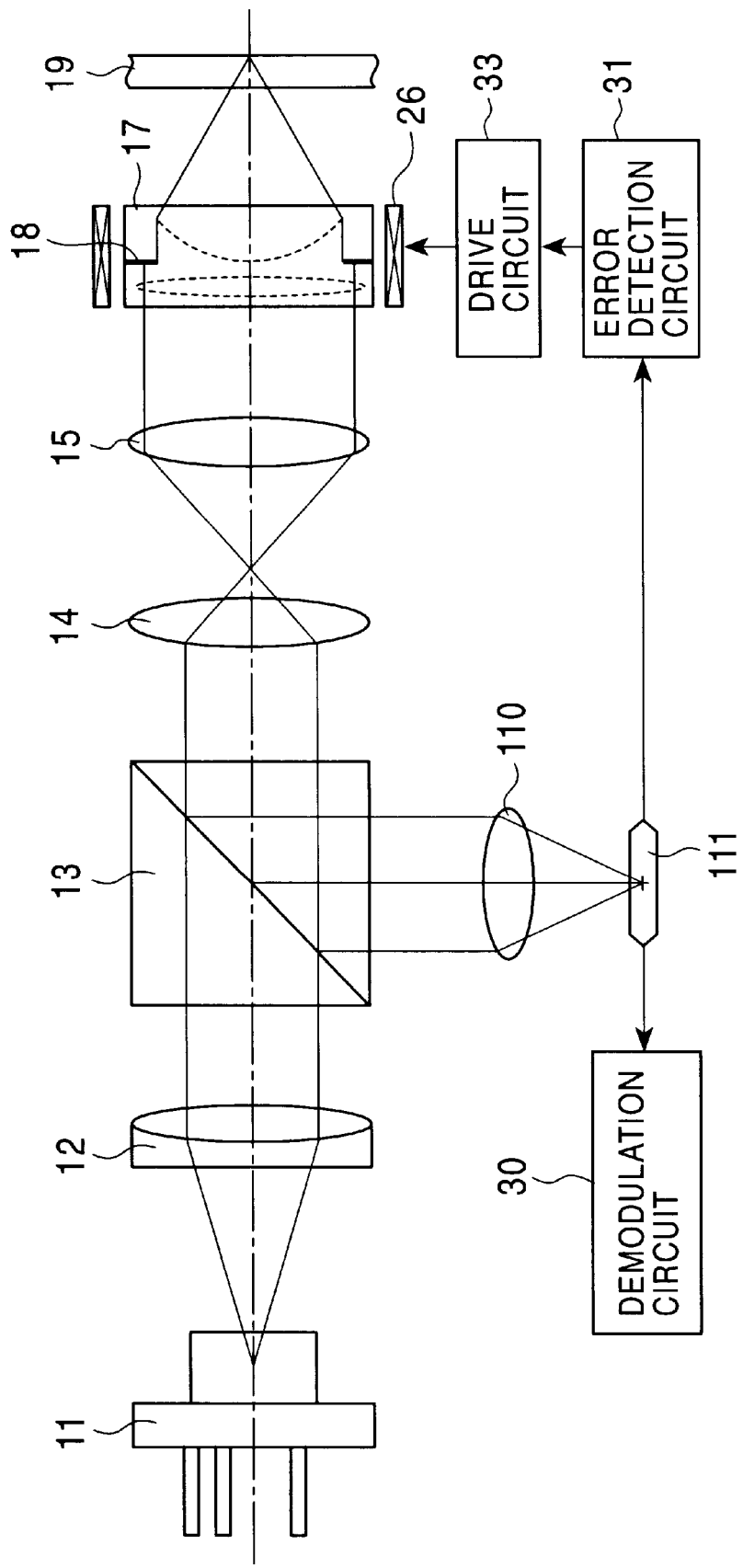
FIG. 2 illustrates a schematic block diagram of an optical system of an information recording/reproducing apparatus.

Referring to FIG. 2, illustrated is an optical system of an information recording/reproducing apparatus for an optical disc according to the present invention. An optical pickup of the apparatus has a blue semiconductor laser 11 that outputs a blue beam of light with short wavelength (400 nm to 415 nm, preferably 405 nm).

Figure 1:
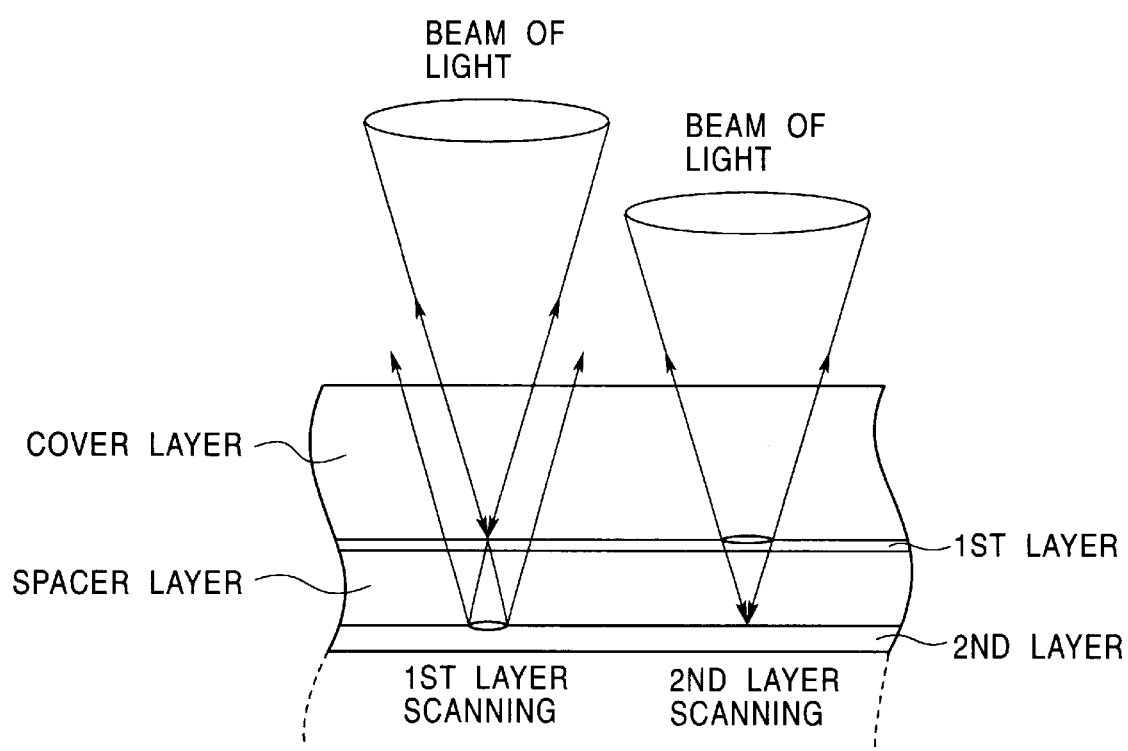
FIG. 1 illustrates a schematic cross sectional view of a two-layer disc.

The optical pickup also includes a polarized beam splitter 13, an expander, a collimator lens 12 and a two-group object lens unit 17. The expander has a first lens 14 and a second lens 15. In the illustrated light radiation system, a divergent beam of light from the semiconductor laser 11 is converted to a parallel beam of light by the collimator lens 12. The parallel beam passes through the polarized beam splitter 13 and is converged to an optical disc 19 by the object lens unit 17. The optical disc 19 is located at a position such that a recording layer of the optical disc 19 is positioned at or in the vicinity of a focusing position of the object lens unit 17. The beam of light therefore creates a light spot in a row of pits on the information recording layer of the optical disc 19. Reference numeral 18 designates a position of a principal surface plane on the incident side of the object lens. The optical disc 19 is similar to the two-layer optical disc shown in FIG. 1 except for the material of the recording layers.

The optical pickup further includes an optical detection system having a detection lens. The object lens unit 17 and polarized beam splitter 13 are utilized for the optical detection system. A reflection light from the optical disc 19 is collected by the object lens unit 17 and directed to a convergent lens 110 by the polarized beam splitter 13. The convergent lens 110 is a detection lens. The light converged by the detection lens 110 is passed through an astigmatism generating element (not shown) such as a cylindrical lens or a multi-lens unit, such that a light spot is created in the vicinity of a center of a light receiving surface 111 of an optical detector.

The light receiving surface 111 of the optical detector is coupled to a demodulation circuit 30 and an error detection circuit 31. The error detection circuit 31 is coupled to a drive circuit 33 for driving a drive mechanism including an actuator 26 to control tracking and focusing of the object lens unit 17.

The optical detector supplies an electric signal to the demodulation circuit 30 and error detection circuit 31 in accordance with an image of the light spot formed in the vicinity of the light receiving surface 111. The demodulation circuit 30 produces a recorded signal on the basis of the electric signal. The error detection circuit 31 produces a focus error signal, a tracking error signal, a servo signal, etc. on the basis of the electric signal, and feeds various drive signals to respective actuators via the actuator drive circuit 33. The actuators operate in response to the drive signals to servo-control the object lens unit 17 and perform other control on other parts.

Operation for reproducing by the above described optical pickup will be described.

The parallel beam of light passing through the polarized beam splitter 13 is corrected by the expander with respect to aberration. The parallel beam of light is converted to a divergent beam having an expander magnification by the first lens 14 of the expander. The divergent beam of light is converted to a parallel beam, convergent or divergent beam by the second lens 15 of the expander because the second lens 15 is actuated along an optical axis in response to the spherical aberration error signal. The aberration of the convergent and divergent beams is corrected by the second lens 15. The emergent beam of the second lens 15 is incident to the object lens unit 17. The illustrated optical system is designed such that if the standard thickness of the cover layer of the optical disc 19 is, for example, 100 μm, the beam of light incident in parallel to the object lens unit 17 forms a spot on the optical disc 19 with the numeral aperture of 0.85 without aberration in an ideal situation (under designed conditions). When the cover layer thickness is the standard value, the expander second lens 15 situated at a reference position causes a parallel beam of light to emerge towards the object lens unit 17 as indicated by the broken line in FIG. 3.

Figure 3:
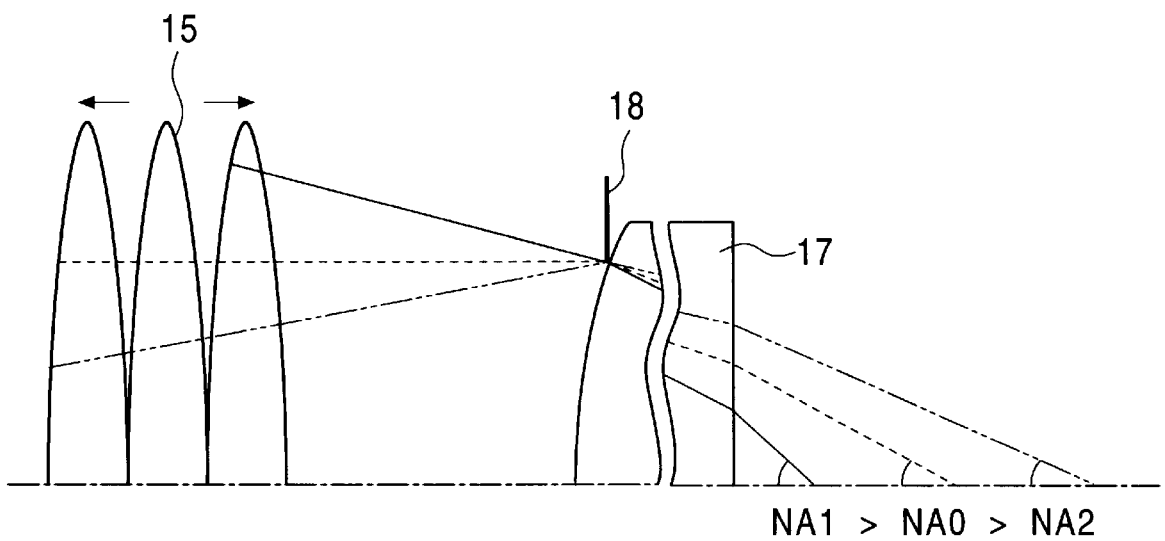
FIG. 3 schematically illustrates how the information recording/reproducing apparatus shown in FIG. 2 operates.

If the cover layer thickness is smaller than the standard value, on the other hand, the expander second lens 15 is moved from the reference position in a direction away from the light source (to the right in FIG. 3) so that a convergent beam is incident to the primary surface position 18 of the object lens as indicated by the solid line in FIG. 3. Accordingly, increased spherical aberration occurs in the object lens unit 17 and compensates for the decrease in the spherical aberration generated in the thin cover layer. Since the aperture is limited by the incident surface of the object lens unit 17, the convergent beam passing through the object lens unit and having a limited diameter has an increased numerical aperture. The numerical aperture increases as the focusing position is shifted to the left in FIG. 3. In other words, the numerical aperture NA is enlarged by the spherical aberration compensation. Contrarily, if the cover layer thickness is greater than the standard value, the second lens 15 is moved toward the light source (to the left in the drawing). As a result, a divergent beam is incident to the principal surface position 18 of the object lens as indicated by the two-dot chain line. The spherical aberration in the object lens unit 17 is therefore decreased, and the increased spherical aberration in the thick cover layer is compensated for.

Figure 4:
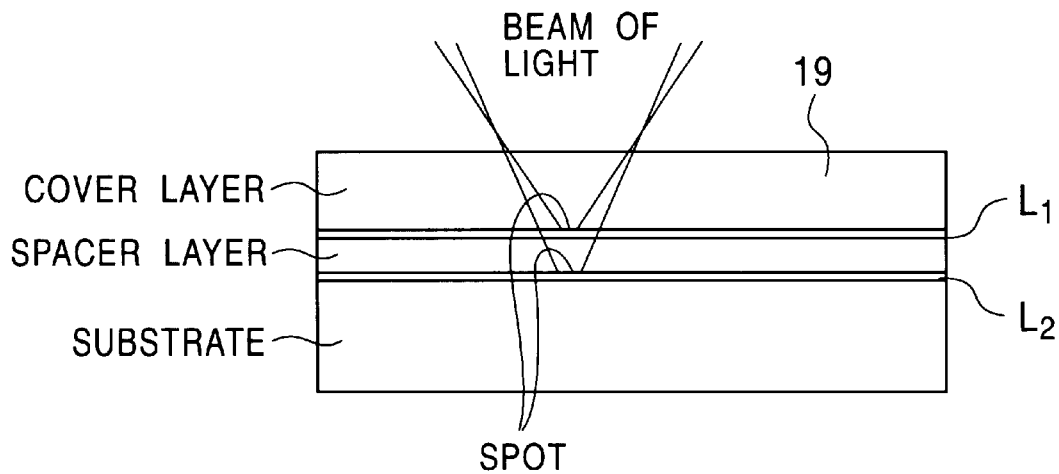
FIG. 4 illustrates a cross sectional view of a two-layer disc according to one embodiment of the present invention.

Referring now to FIG. 4, illustrated is an example of a two-layer optical disc 19. The numerical aperture $NA_1$ at the first layer is 0.85 when the cover layer thickness to the semitransparent first layer $L_1$ of the two-layer optical disc 19 is 100 μm, the spacer thickness between the first layer $L_1$ and second layer $L_2$ is 50 μm, and the numerical aperture $NA_2$ at the second layer is 0.84. Thickness of the first layer $L_1$ is 15 nm, and thickness of the second layer $L_2$ is 15 nm.

Even if the spherical aberration compensation is performed and the spot expansion resulting from the spherical aberration at the converged light spot is corrected at the respective layers, the size of the spot differs from one layer to another layer because the numerical aperture differs. The area ratio of the spots is a ratio of the square of the numerical apertures.

In the above described example, if the spot area on the second layer is 100%, then the spot area on the first layer becomes 97.6%. The latter value 97.6% is given by the equation (0.84×0.84)/(0.85×0.85)×100%.

The first layer is the semitransparent recording layer. If a ratio of first layer absorptance to a product of first layer transmissivity and second layer absorptance is set to be equal to the above mentioned area ratio, it is possible to record information under the same condition at both of the layers. Specifically, if the materials of the first and second layers $L_1$ and $L_2$ stacked via a light-transmissive layer are determined to satisfy the following equation, the same recording condition can be used for the respective layers.

$$(Tr_1 \times Ab_2)/Ab_1 \approx (NA_2)^2/(NA_1)^2$$

where $Tr_1$ represents the transmissivity of the first layer $L_1$, $Ab_2$ represents the absorptance of the second layer $L_2$, $Ab_1$ represents the absorptance of the first layer $L_1$, $NA_2$ represents the numerical aperture on the second layer $L_2$ and $NA_1$ represents the numerical aperture on the first layer $L_1$.

For instance, the first layer absorptance $Ab_1$ of the two-layer optical disc is set to 12.0%, the first layer transmissivity $Tr_1$ is set to 55.0% and the second layer absorptance $Ab_2$ is set to 21.3%. The material of the first and second layers is a phase change material such as Ge—Sb—Te. The transmissivity and absorptance of each layer can also be controlled by the layer thickness.

With the above mentioned values, the product of the first layer transmissivity $Tr_1$ and second layer absorptance $Ab_2$ is 11.7%. The ratio of the product (11.7%) to the first layer absorptance $Ab_1$ (12.0%) is 97.5%. The ratio of the square of the second layer numerical aperture $NA_2$ to the square of the first layer aperture $NA_1$ is 97.6%, which is substantially equal to 97.5%. Accordingly, the above mentioned equation condition is met.

Figure 5:
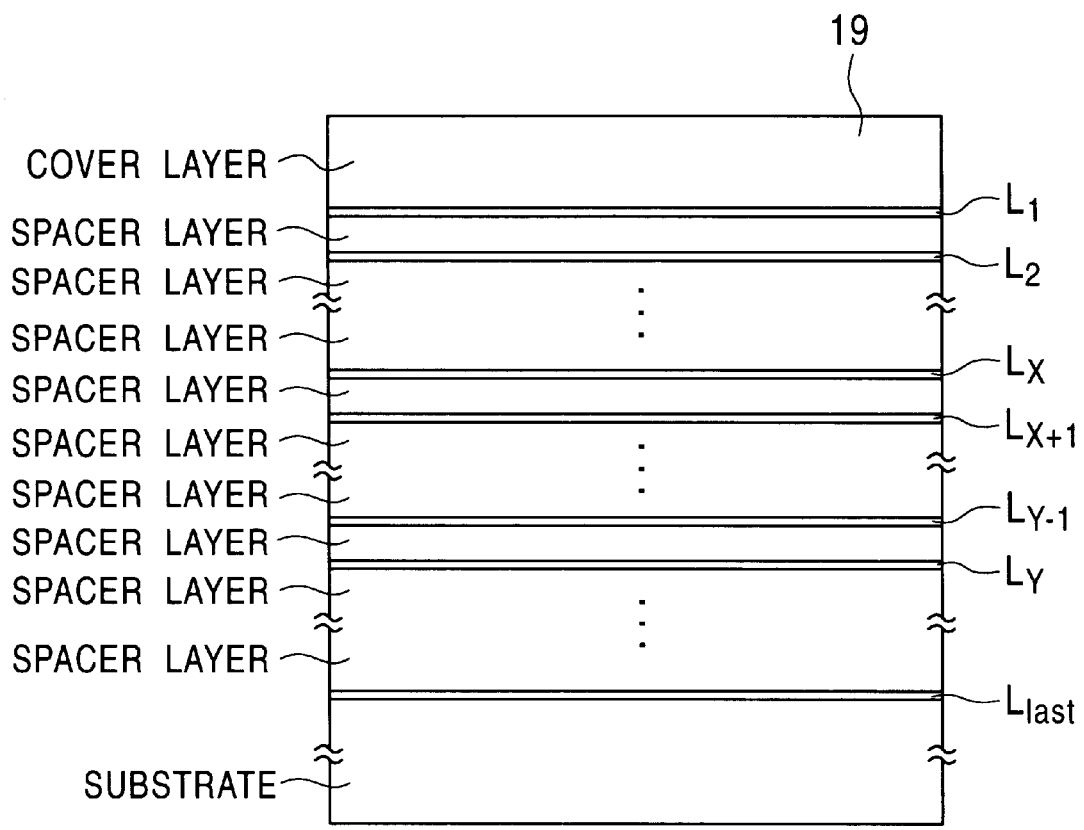
FIG. 5 illustrates a cross sectional view of a multi-layer disc according to another embodiment of the present invention.

The above described embodiment deals with the two-layer optical disc having two recording layers and a single spacer layer interposed between the two recording layers. Referring to FIG. 5, illustrated is a multi-layer optical disc having a plurality of pairs of recording layers and light-transmissive layers stacked one after another. In other words, the recording layers and spacer layers are stacked alternately at least twice in the illustrated multi-layer optical disc. Information is recorded in and retrieved from the multi-layer optical disc upon radiating of a convergent beam of light. If arbitrary two recording layers satisfy the following equation, it is possible to record information in the two recording layers under the same condition. Specifically, if the material of one recording layer $L_x$ at the first depth, which is closer to the beam radiation side than the other recording layer $L_y$, and the material of the other recording layer $L_y$ at the second depth are determined to satisfy the following equation, the recordation can be performed under the same condition.

$$(Tr_x \times Tr_z \times Ab_y)/Ab_x \approx (NA_y)^2/(NA_x)^2$$

where $Tr_x$ represents the transmissivity of the proximal layer $L_x$, $Tr_z$ represents the sum of transmissivity of the recording layers $L_{x+1}$ to $L_{y-1}$ and spacer layers stacked between the proximal layer $L_x$ and distal layer $L_y$, $Ab_y$ represents the absorptance of the distal layer, $Ab_x$ represents the absorptance of the proximal layer, $NA_y$ represents the numerical aperture on the distal layer and $NA_x$ represents the numerical aperture of the proximal layer.

It should be noted that the specific numbers and values mentioned as to the two-layer optical disc are mere examples. Other transmissivity and absorptance can be employed to obtain the same result/effect as long as the transmissivity and absorptance of the recording layers are determined to follow the above described principle. Further, the recording layers may include land track(s) and/or groove track(s). The recording layers maybe made from a magneto-optic material. The first and second recording layers may be made from the same or different material.

The present invention is also applicable to an optical system that utilizes a so-called solid immersion lens having a numerical aperture greater than one.

As understood from the foregoing description, the recording layers of the optical multi-layer information recording medium according to the present invention have characteristics such that optical density on different recording layers becomes substantially the same even if the numerical apertures are made different at the different recording layers upon the spherical aberration compensation. Consequently, the recording power does not have to be adjusted for the different recording layers. In the present invention, the transmissivity and reflectance of the recording layers are determined in accordance with the changed numerical apertures respectively. Therefore, it is possible to ensure appropriate recording with the same recording power.

This application is based on Japanese Patent Application No. 2000-366668 and the entire disclosure thereof is incorporated herein by reference.

What is claimed is:

1. An optical multi-layer information recording medium for recording information therein and/or retrieving information therefrom upon radiation of a convergent beam of light comprising:

at least two pairs of recording layers and light-transmissive layers stacked one after another, wherein a first recording layer proximal to a beam radiation side and a second recording layer distal from the beam radiation side are made from a material that satisfies the following equation:

$$(Tr_x \times Tr_z \times Ab_y)/Ab_x \approx (NA_y)^2/(NA_x)^2$$

where $Tr_x$ represents transmissivity of the first recording layer, $Tr_z$ represents a sum of transmissivity of recording layer(s) and light transmissive layer(s) stacked between the first and second recording layers, $Ab_y$ represents absorptance of the second recording layer, $Ab_x$ represents absorptance of the first recording layer, $NA_y$ represents a numerical aperture on the second recording layer and $NA_x$ represents a numerical aperture of the first recording layer.

2. The optical multi-layer information recording medium according to claim 1, wherein at least one of the recording layers includes a land track and a groove track.

3. The optical multi-layer information recording medium according to claim 1, wherein at least one of the recording layers is made from a phase change material.

4. The optical multi-layer information recording medium according to claim 1, wherein at least one of the recording layers is made from a magneto-optic material.

5. The optical multi-layer information recording medium according to claim 1, wherein the recording layers are made from different materials.

6. An optical multi-layer information recording medium for recording information therein and/or retrieving information therefrom upon radiation of a convergent beam of light comprising:

a first recording layer proximal to a beam radiation side;

a light-transmissive layer stacked on the first recording layer; and a second recording layer stacked on the light-transmissive layer and distal from the beam radiation side, wherein the first and second recording layers are made from a material that satisfies the following equation:

$$(Tr_1 \times Ab_2)/Ab_1 \approx (NA_2)^2/(NA_1)^2$$

where $Tr_1$ represents transmissivity of the first recording layer, $Ab_2$ represents absorptance of the second recording layer, $Ab_1$ represents absorptance of the first recording layer, $NA_2$ represents a numerical aperture on the second recording layer and $NA_1$ represents a numerical aperture on the first recording layer.

7. The optical multi-layer information recording medium according to claim 6, wherein at least one of the recording layers includes a land track and a groove track.

8. The optical multi-layer information recording medium according to claim 6, wherein at least one of the recording layers is made from a phase change material.

9. The optical multi-layer information recording medium according to claim 6, wherein at least one of the recording layers is made from a magneto-optic material.

10. The optical multi-layer information recording medium according to claim 6, wherein the first recording layer is made from a different material than the second recording layer.

* * * * *

UNITED STATES PATENT AND TRADEMARK OFFICE
CERTIFICATE OF CORRECTION

PATENT NO.    : 6,667,947 B2
DATED         : December 23, 2003
INVENTOR(S)   : Maeda et al.

It is certified that error appears in the above-identified patent and that said Letters Patent is hereby corrected as shown below:

<u>Title page, Item [54] and Column 1, lines 1-2,</u>
Title, should read -- OPTICAL MULTI-LAYER INFORMATION RECORDING MEDIUM -- instead of "OPTICAL MULTI-LAYER INFORMATION RECORDATING MEDIUM".

Signed and Sealed this

Twenty-second Day of June, 2004

JON W. DUDAS
*Acting Director of the United States Patent and Trademark Office*